United States Patent
Hashizume et al.

(10) Patent No.: US 9,787,165 B2
(45) Date of Patent: Oct. 10, 2017

(54) MOTOR WITH SIMPLIFIED WINDING AND REDUCED BRUSH WEAR

(71) Applicant: Nidec Corporation, Kyoto (JP)

(72) Inventors: Naohiro Hashizume, Kyoto (JP); Yusuke Makino, Kyoto (JP); Takahiro Hiwa, Kyoto (JP); Shohei Osuga, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 220 days.

(21) Appl. No.: 14/417,562

(22) PCT Filed: Dec. 3, 2013

(86) PCT No.: PCT/JP2013/007077
§ 371 (c)(1),
(2) Date: Jan. 27, 2015

(87) PCT Pub. No.: WO2014/103180
PCT Pub. Date: Jul. 3, 2014

(65) Prior Publication Data
US 2015/0318769 A1    Nov. 5, 2015

(30) Foreign Application Priority Data

Dec. 28, 2012   (JP) ................................. 2012-286972

(51) Int. Cl.
*H02K 13/10* (2006.01)
*H02K 13/04* (2006.01)
(Continued)

(52) U.S. Cl.
CPC ............... *H02K 13/10* (2013.01); *H02K 3/28* (2013.01); *H02K 13/04* (2013.01); *H02K 23/30* (2013.01)

(58) Field of Classification Search
CPC .......... H02K 3/00–3/528; H02K 13/04; H02K 13/10; H02K 23/30; H02K 3/28
(Continued)

(56) References Cited

U.S. PATENT DOCUMENTS

| 2007/0152532 | A1  | 7/2007 | Roos et al. |
| 2011/0095638 | A1* | 4/2011 | Sakata ................... H02K 23/20 310/179 |
| 2012/0086297 | A1  | 4/2012 | Makino |

FOREIGN PATENT DOCUMENTS

| JP | 06-070521 A | 3/1994 |
| JP | 10-174403 A | 6/1998 |

(Continued)

OTHER PUBLICATIONS

Machine Translation, Makino, JP 2011244564 A, Dec. 1, 2011.*
Official Communication issued in International Patent Application No. PCT/JP2013/007077, dated Mar. 4, 2014.

*Primary Examiner* — Thomas Truong
(74) *Attorney, Agent, or Firm* — Keating & Bennett, LLP

(57) ABSTRACT

A motor includes an armature core having m×n teeth (m is an odd number ≥3, and n is a natural number ≥2), a plurality of coils, and a commutator. The motor further includes field magnets including 2n magnetic poles and at least a first-potential brush and at least a second-potential brush. The commutator includes a segment group defined by 2m×n segments. Only the coil defined by winding a continuous conducting wire in a predetermined winding direction is disposed in each of k teeth among the m×n teeth, and only the coil defined by winding the continuous conducting wire in a direction reverse to the predetermined winding direction is disposed in each of teeth disposed at a position separated from each of the k teeth at 360×i degrees (i is a natural number ≤(n−1)) of electric angles.

12 Claims, 20 Drawing Sheets

(51) Int. Cl.
*H02K 3/28* (2006.01)
*H02K 23/30* (2006.01)
(58) Field of Classification Search
USPC .................................................. 310/195, 220
See application file for complete search history.

(56) References Cited

FOREIGN PATENT DOCUMENTS

| | | |
|---|---|---|
| JP | 2006-109562 A | 4/2006 |
| JP | 2008-113485 A | 5/2008 |
| JP | 2011-244564 A | 12/2011 |

\* cited by examiner

MOTOR WITH SIMPLIFIED WINDING AND REDUCED BRUSH WEAR

BACKGROUND OF THE INVENTION

1. Field of the Invention

The present invention relates to a motor provided with a brush.

2. Description of the Related Art

In a motor provided with a brush, the brush is worn and shortened due to electrical sparking generated between the brush and segments. It is possible to improve a life span of the motor by reducing the wear of the brush caused by sparking. As a method for reducing the wear of the brush caused by sparking, the number of segments in a commutator being increased by two times the number of teeth has been disclosed in Japanese Patent Application publication No. 2008-113485, for example. Particularly, since a space factor is high in the case of a motor with a concentrated winding, electrical energy accumulated in a coil is increased. Therefore, it is important to reduce the wear due to sparking.

The motor disclosed in Japanese Patent Application publication No. 2008-113485 has a small potential difference between the segments, upon comparison with the case where the number of segments is the same with the number of teeth. Therefore, the sparks are reduced. If the number of segments is the same with the number of teeth, a border between the segments is placed so as to be matched with a position of teeth. If the number of segments is twice the number of teeth, a border between the segments is also positioned between the teeth. In the motor of the related art where the number of segments is twice the number of teeth, a first coil wound in a forward direction and a second coil wound in a reverse direction are disposed in each of the teeth. Therefore, when the brush is in contact with the new segment positioned between the teeth, electrification with respect to the coil on the tooth disposed at a position deviated at 180° in electric angles is switched. As a result, even in the case where the number of segments is twice the number of teeth, it is possible to produce the same torque as in the case where the number of segments is the same as the number of teeth.

However, in the winding structure described above, it is necessary to wind a coil in the forward direction and the reverse direction on a tooth, and thus the winding process and the leading-out of a conducting wire to the segment become complicated. Therefore, a number of man-hours required to make the motor is increased.

SUMMARY OF THE INVENTION

In an exemplary preferred embodiment of the present application, the motor includes a static section, a rotation section, and a bearing portion which supports the rotation section rotatably around a central axis. The rotation section includes a shaft extending along the central axis, an armature core having m×n teeth (in this case, m is an odd number equal to or more than 3, and n is a natural number equal to or more than 2) which are attached on the shaft and radially extend in the radial direction, a plurality of coils respectively provided on the m×n teeth, and a commutator electrically connected to the plurality of coils. The static section includes field magnets having 2n magnetic poles facing the m×n teeth in the radial direction, and a brush group including at least a first-potential brush and at least a second-potential brush. The commutator includes a segment group defined by 2m×n segments which are arranged in a circumferential direction and in contact with the brush group. In at least a conducting wire defining each coil, each end portion thereof is connected to any one of the segments. In the segment group, the potential is cyclically increased or decreased between the first potential and the second potential in the circumferential direction, due to the contact of the brush group and the commutator. Also, (m−1) segments are provided between the first-potential segment and the second-potential segment. The coils are connected in series between the first-potential segment and the second-potential segment via the segments. Only the coil defined by winding a continuous conducting wire in a predetermined winding direction is disposed in each of k teeth among the m×n teeth. Further, only the coil defined by winding the continuous conducting wire in a direction reverse to the predetermined winding direction is disposed in each of the teeth disposed at a position separated from each of the k teeth at 360×i degrees (in this case, i is a natural number equal to or less than (n−1)) of electric angles.

According to the exemplary preferred embodiment of the present application, it is possible to significantly reduce or prevent the wear of a brush caused by sparks and to simplify a winding process.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
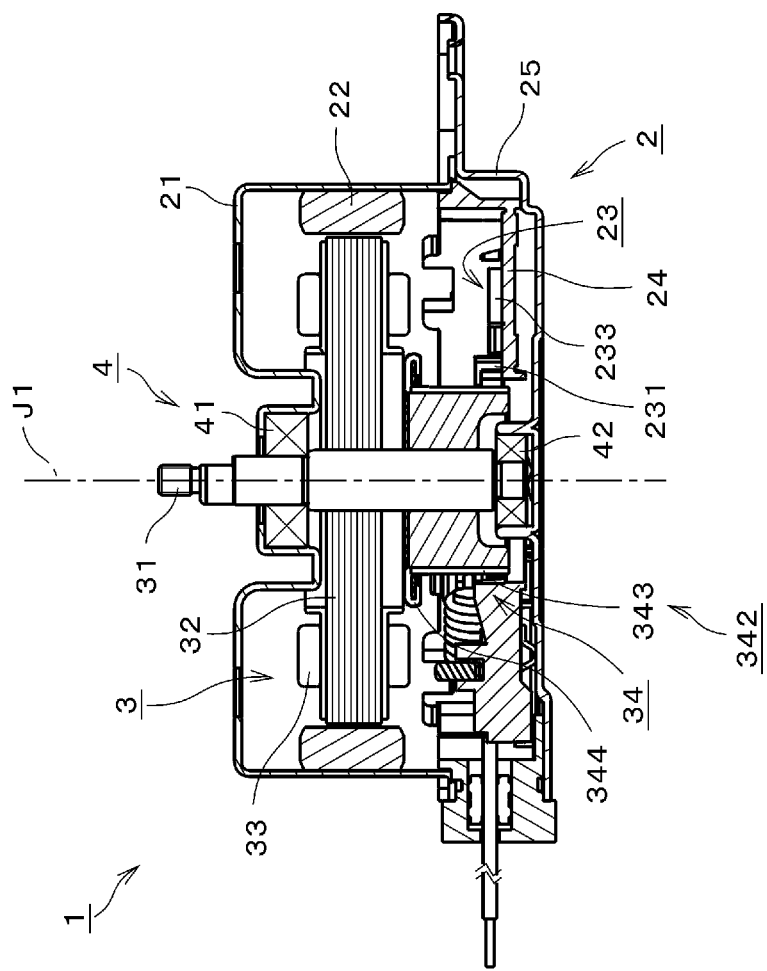
FIG. 1 is a cross-sectional view of a motor according to a preferred embodiment of the present invention.

In the specification, an output side of a shaft is simply designated as "upper side", and the opposite side thereof is simply designated as "lower side", in a direction parallel or substantially parallel to a central axis J1 of FIG. 1. The expression "upper side" and "lower side" are not necessarily matched to the gravity direction. Furthermore, a radial direction centering on the central axis J1 is simply designated as "radial direction", a circumferential direction centering on the central axis J1 is simply designated as "circumferential direction", and a direction parallel or substantially parallel to the central axis J1 is simply designated as "axial direction".

FIG. 1 is a longitudinal cross-sectional view of a motor 1 according to an exemplary preferred embodiment of the invention. The motor 1 is a motor provided with a brush. Hatched lines which describe details of a cross-sectional surface are omitted for the sake of clarity. The motor 1 includes a static section 2, a rotation section 3, and a bearing portion 4. The bearing portion 4 is configured to rotatably support the rotation section 3 with respect to the static section 2, around the central axis J1 in an up-down direction.

The static section 2 preferably includes a housing 21, field magnets 22, a brush group 23, a circuit board 24, and bracket 25. The housing 21 preferably has a cylindrical lidded shape. The bracket 25 covers a lower portion of the housing 21. The field magnets 22 are disposed on an inner circumferential surface of a cylindrical portion of the housing 21. The brush group 23 is disposed on the circuit board 24.

The rotation section 3 preferably includes a shaft 31, an armature core 32, a plurality of coils 33, and a commutator 34. The shaft 31 extends along the central axis J1. The armature core 32 is preferably defined by laminating electromagnetic steel sheets having a thin plate shape. The armature 32 is attached to the shaft 31. A central axis of the shaft 31, a central axis of the armature core 32, and a central axis of the field magnet 22 are matched with the central axis J1 of the motor 1.

Two bearing elements 41 and 42 define the bearing portion 4. The bearing element 41 is attached to the housing 21. The bearing element 42 is attached to the bracket 25. The bearing elements 41 and 42 are preferably ball bearings or slide bearings, for example. The bearing portion 4 may be defined by a bearing element. The rotation section 3 is supported rotatably around the central axis J1, by the bearing portion 4.

Figure 2:
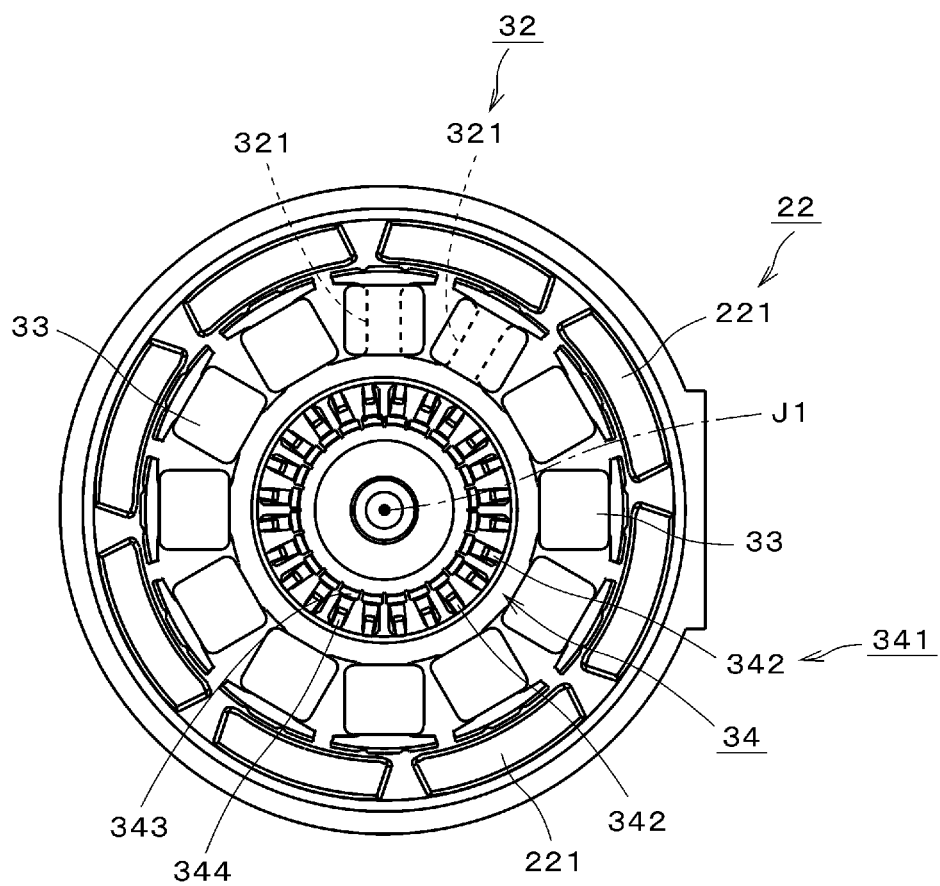
FIG. 2 is a bottom view showing a portion of the motor.

FIG. 2 is a bottom view showing a state of the motor 1 where the brush group 23, the circuit board 24 and the bracket 25 are removed. A plurality of magnet elements 221 define the field magnet 22. N-poles and S-poles are alternately disposed along a circumferential direction, on a central axis J1 side of the field magnet 22. In the present preferred embodiment, four pairs of N-poles and S-poles are preferably provided, and therefore, the number of magnetic poles is preferably eight, for example. In addition, the field magnet 22 may be a single annular member, for example.

The armature core 32 includes a plurality of teeth 321. Each of the teeth 321 radially extends toward a radially outer side. In the present preferred embodiment, the number of teeth 321 is preferably twelve, for example. The teeth 321 face the field magnet 22 in a radial direction. The plurality of coils 33 are respectively provided in the plurality of teeth 321. That is, the coils 33 are provided in the armature core 32 in the manner of a so-called concentrated winding. However, the conducting wire defining a coil 33 is not limited to a single continuous wire, as described later, but could be provided by any desirable type of wire. Torque centering on the central axis J1 is generated between the rotation section 3 and the field magnet 22, by applying a current to the coil 33.

The commutator 34 is electrically connected to the plurality of coils 33. The commutator 34 includes a segment group 341. The segment group 341 is preferably defined by a plurality of segments 342 arranged in the circumferential direction. As shown in FIGS. 1 and 2, the segment 342 includes a contacting portion 343 and a connecting portion 344. The contacting portion 343 extends parallel to the central axis J1. The contacting portion 343 is in contact with the brush group 23. The connecting portion 344 protrudes on the radially outer side from the contacting portion 343.

The connecting portion 344 is connected to the conducting wire of the coil 33. Specifically, the conducting wire of the coil 33 is put on the connecting portion 344, and then the conducting wire and the connecting portion 344 are electrically connected to each other in a heat-fused manner, for example. Each end portion of the conduction wire defining each coil 33 is connected to any one of the segments 342.

Figure 3:
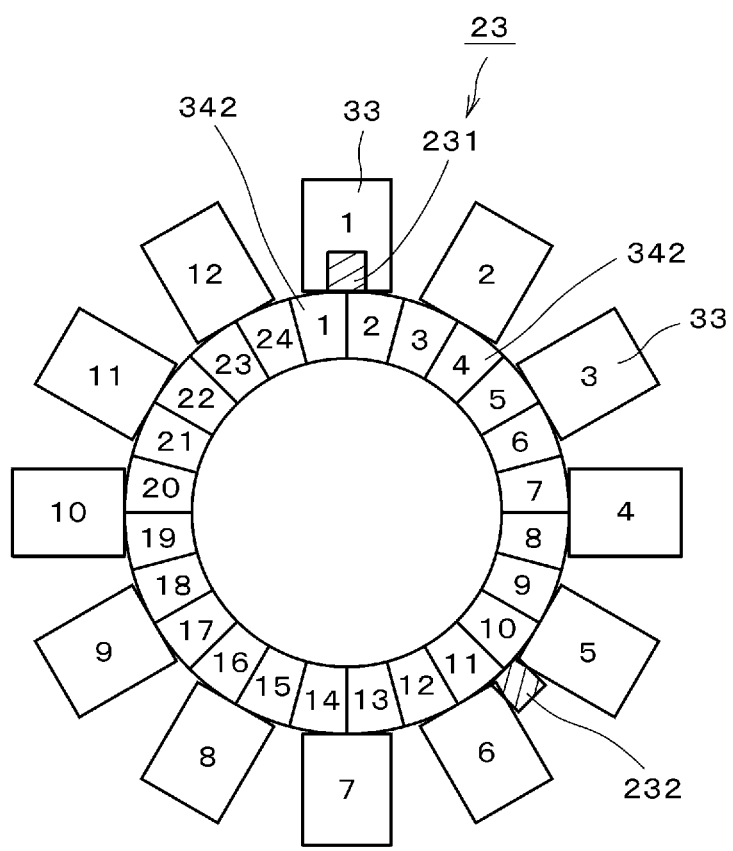
FIG. 3 is a view showing a simplified positional relationship between coils, segments, and a brush group according to a preferred embodiment of the present invention.

FIG. 3 is a view showing a simplified positional relationship between the coils 33, the segments 342 and the brush group 23. In the FIG. 3, the numbers 1 to 12 are respectively given to the twelve coils 33 in a clockwise direction. The numbers 1 to 24 are respectively given to the twenty-four segments 342. The positions of the coils 33 in the circumferential direction are matched with the positions of the teeth 321 in the circumferential direction. The central axis of the coil 33 extends in the radial direction and is matched to a border between the segments 342. Specifically, the central axis of the 1st coil 33 preferably overlaps the border between the 1st segment 342 and the 2nd segment 342. The central axis of the 2nd coil 33 preferably overlaps the border between the 3rd segment 342 and the 4th segment 342.

In the present preferred embodiment, a first brush 231 and a second brush 232 define the brush group 23. As shown in FIG. 1, the first brush 231 is pushed toward the segment 342, by an elastic portion 233. The second brush 232 is pushed the same way. In a state shown in FIG. 3, the position of the 1st coil 33 in the circumferential direction is matched with the position of the first brush 231 in the circumferential direction. In this state, the first brush 231 is in contact with the 1st segment 342 and the 2nd segment 342. The position of the second brush 232 in the circumferential direction is matched with the intermediate position between the 5th coil 33 and the 6th coil 33. The second brush 232 is in contact with the 10th segment 342 and the 11th segment 342.

The first brush 231 and the second brush 232 are respectively connected to a positive electrode and a negative electrode of a power source, via the circuit board 24. The electrical potential of the first brush 231 is a predetermined first potential, and the first potential is applied to the segment 342. The electrical potential of the second brush 232 is a second potential different from the first potential, and the second potential is applied to the other segment 342. An interval between the first brush 231 and the second brush 232 in the circumferential direction is an odd-number multiple of a pitch between the magnetic poles. In FIG. 3, the first brush 231 and the second brush 232 are separated by, for example, about 135° in the circumferential direction. In the preferred embodiment, the angle of about 135° is preferably three times the pitch between the magnetic poles, for example.

Furthermore, the brush group 23 may include an additional first brush 231 and second brush 232. In this case, an interval between a plurality of the first brushes 231 in the circumferential direction is an even-number multiple of the pitch between the magnetic poles. This is also the same in regard to a plurality of second brushes 232. In addition, it is possible to provide a third brush, which applies electrical potential different from the first and second potential to the segment 342, in the brush group 23. For example, an output torque of the motor 1 is changed by switching the first brush 231 and the third brush. As described above, the brush group 23 includes at least a brush of a first potential and at least a brush of a second potential.

Figure 4:
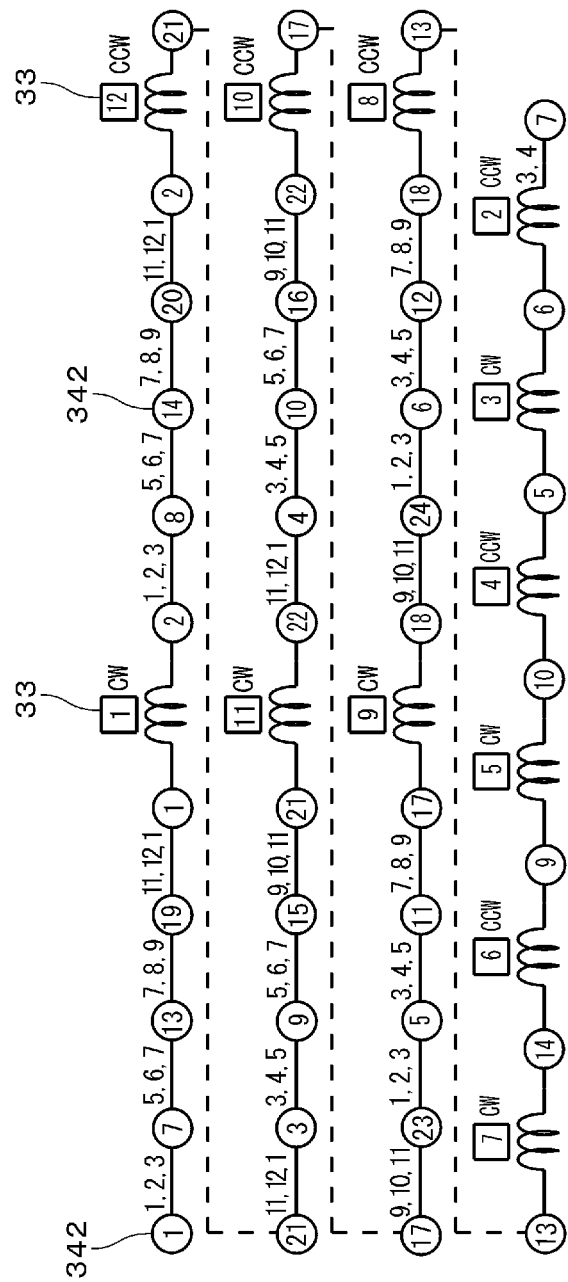
FIG. 4 is a view showing a connection structure between the coils and the segments.

FIG. 4 is a view showing a connection structure between the coils 33 and the segments 342. A circled number indicates the segment 342. A number in a rectangle indicates the coil 33 or the tooth 321. Numbers between the segments 342 indicate the number of teeth 321 through which the conducting wire passes. "CW" written on the right side of the coil 33 indicates that the conducting wire is wound around the tooth 321 in the clockwise direction seen from the radially outer side. "CCW" indicates that the conducting wire is wound around the tooth 321 in the counterclockwise direction seen from the radially outer side. Hereinafter, the connection structure between the coil 33 and the segment 342 is referred as "winding structure".

Figure 5A:
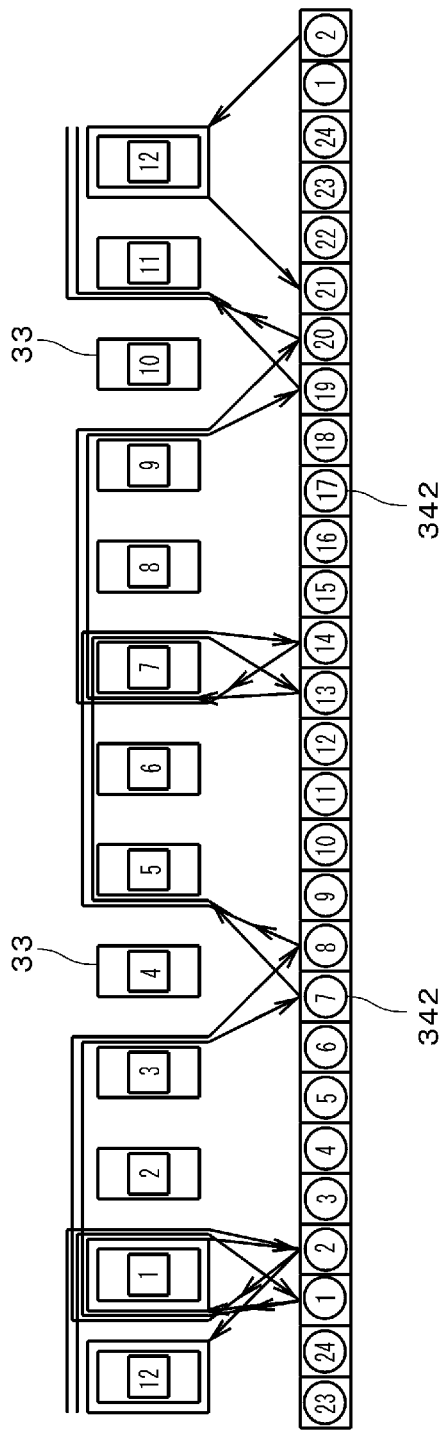
FIG. 5A is a view showing a leading-out of winding according to a preferred embodiment of the present invention.
Figure 5B:
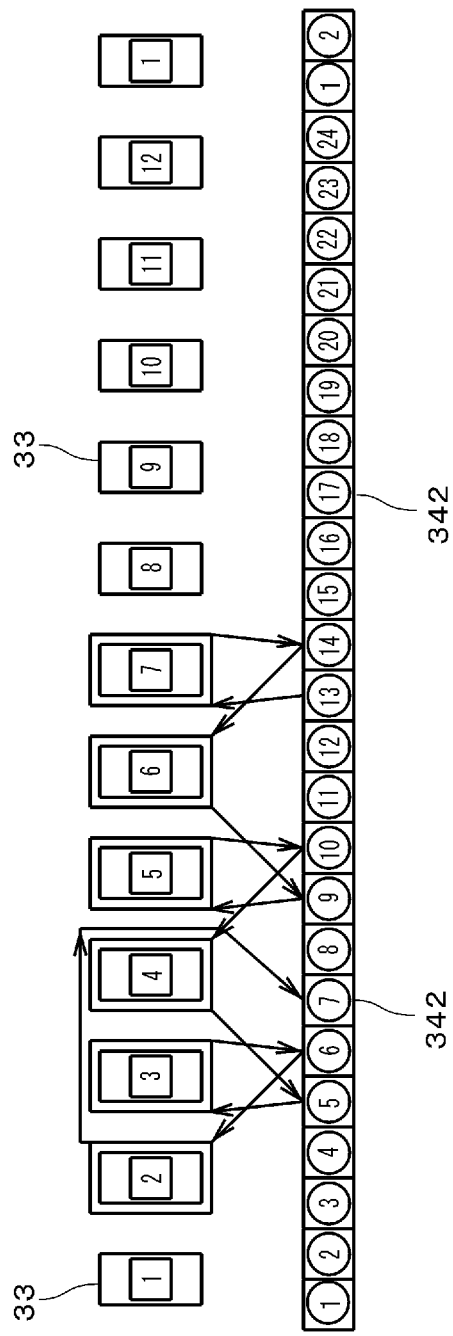
FIG. 5B is a view showing a leading-out of winding according to a preferred embodiment of the present invention.

Although the winding structure is shown in the four stages in FIG. 4, the stages are continuous in order by being defined by a conducting wire, as shown by a broken line. FIG. 5A shows a leading-out of winding in the uppermost stage of FIG. 4. FIG. 5B shows a leading-out of winding in the lowermost stage of FIG. 4. The circle and rectangle in the FIGS. 5A and 5B indicate the segment 342 and the coil 33 or the tooth 321, in the same manner as FIG. 4.

Specifically, after the conducting wire is put on the 1st segment 342, it passes through the bases of the 1st, 2nd and 3rd teeth 321, and then it is put on the 7th segment 342. The bases of the teeth 321 are annular-shaped portions on a core back side which is placed on a radially inner side of the teeth 321. When the conducting wire is put on the segment 342, the conducting wire is wound around the connecting portion 344 only one round, for example. Next, the conducting wire comes out of the 7th segment 342 and passes through the bases of the 5th, 6th, and 7th teeth 321, and then is put on the 13th segment 342. Subsequently, the conducting wire comes out of the 13th segment 342 and passes through the bases of the 7th, 8th, and 9th teeth 321, and then is put on the 19th segment 342. Next, the conducting wire comes out of the 19th segment 342 and passes through the bases of the 11th, 12th and 1st teeth 321, and then is put on the 1st segment 342. The potential of the 1st, 7th, 13th, and 19th segments 342 is the same by putting the conducting wire on the 1st, 7th, 13th and 19th segments 342.

The conducting wire coming out of the 1st segment 342 is wound around the first tooth 321 in the clockwise direction, whereby the 1st coil 33 is formed. The conducting wire coming out of the 1st coil 33 is put on the second segment 342. Next, the conducting wire comes out of the 2nd segment 342 and passes through the bases of the 1st, 2nd, and 3rd teeth 321, and then is put on the 8th segment 342. Thereafter, the conducting wire is repeatedly put on the segments 342 and wound around the teeth 321, as shown in FIG. 4, such that the twelve coils 33 are defined. In the end of the process, the conducting wire is put on the 7th segment 342.

Figure 6:
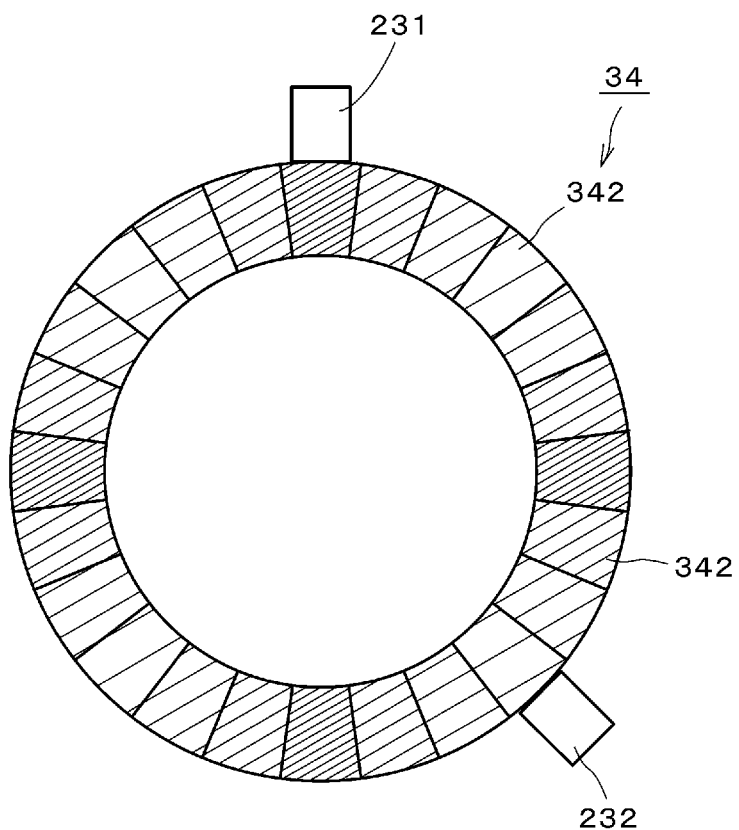
FIG. 6 is a view showing a distribution of potential in a segment group according to a preferred embodiment of the present invention.

FIG. 6 is a view showing a distribution of potential in the segment group 341. An electrical potential of the segment 342 being in contact with the first brush 231 is the same first potential as the first brush 231. An electrical potential of the segment 342 being in contact with the second brush 232 is the same second potential as the second brush 232. In this case, the first potential is higher than the second potential.

In FIG. 6, the high or low state of the potential of each segment 342 is illustrated by a density of hatched lines. The potential of the segment 342 in FIG. 6, which is placed at about 90° intervals in the circumferential direction with respect to the segment 342 being in contact with the first brush 231, is the first potential. The potential of the segment 342, which is placed at about 90° intervals in the circumferential direction with respect to the segment 342 being in contact with the second brush 232 is the second potential. When seen along the circumferential direction, the potential of the segment 342 varies gradually between the first potential and the second potential in a cycle of about 90° in mechanical angles, for example. The angle of about 90° is an angular pitch of a pair of magnetic poles in the field magnet 22, and which corresponds to 360° in electric angles, for example.

In order to express generally, the number of magnetic poles of the field magnets 22 is designated as 2n. Also, the number of coils 33 is designated as m×n, and the number of segments 342 is designated as 2m×n. That is, in the case where the pair number of magnetic poles is n (n is a natural number equal to or more than 2), and the number of phases is m (m is an odd number equal to or more than 3), the potential in the segment group 341 is increased or decreased between the first potential and the second potential at a cycle of 2m segments (=(2m×n)/n) in regard to the circumferential direction, due to the contact between the brush group 23 and the commutator 34. (m−1) segments 342 are placed between the first-potential segment 342 and the second-potential segment 342 closest thereto. In the case of FIG. 6, n is 4, and m is 3.

In addition, to achieve the potential distribution described above, the coils 33 are preferably connected in series between the first-potential segment 342 and the second-potential segment 342 via the segments 342. The number of segments 342 between the coils 33 is at least 1, and the number of coils 33 connected in series is m. In the adjacent coils 33, the conducting wire is wound in the opposite direction to each other, as shown in FIG. 4.

Upon comparison with the case where the number of segments is the same with the number of coils, since the potential in the circumferential direction is gradually changed, the difference of potential between the segments 342 is reduced. As a result, electrical sparking generated between the brush and the segment is significantly reduced or prevented, and therefore, it is possible to improve a life span of the brush by reducing the wear on the brush. Meanwhile, in order to make the number of segments twice the number of coils, the conducting wire is wound around each tooth in the clockwise and the counterclockwise directions in the related art. However, the conducting wire is preferably wound around each tooth 321 only in one direction, in the motor 1. Thus, it is possible to simplify a winding process, and therefore, it is possible to reduce a labor time required for winding. As a result, it is possible to reduce the manufacturing cost of the motor 1.

Next, the principle of the winding structure in which the number of segments is twice the number of coils, and thus, enabling the simplification of the winding process will be described. In order to simplify the description, the motor equipped with four poles and six slots, for example, will be described. In the following description, the same reference numbers from the above description are given to the same components.

Figure 7:
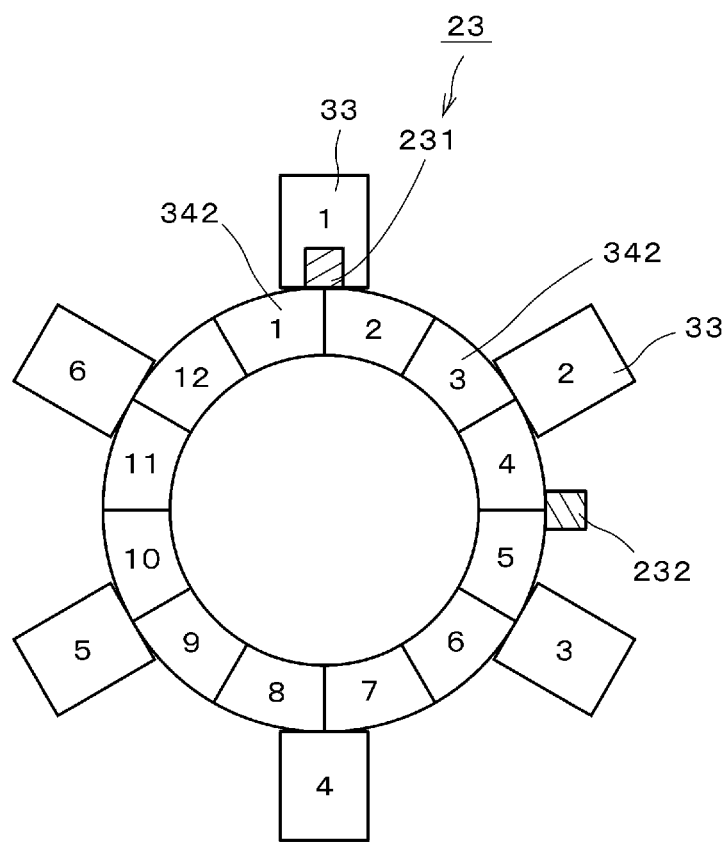
FIG. 7 is a view showing a simplified positional relationship between coils, segments, and a brush group according to a preferred embodiment of the present invention.
Figure 8:
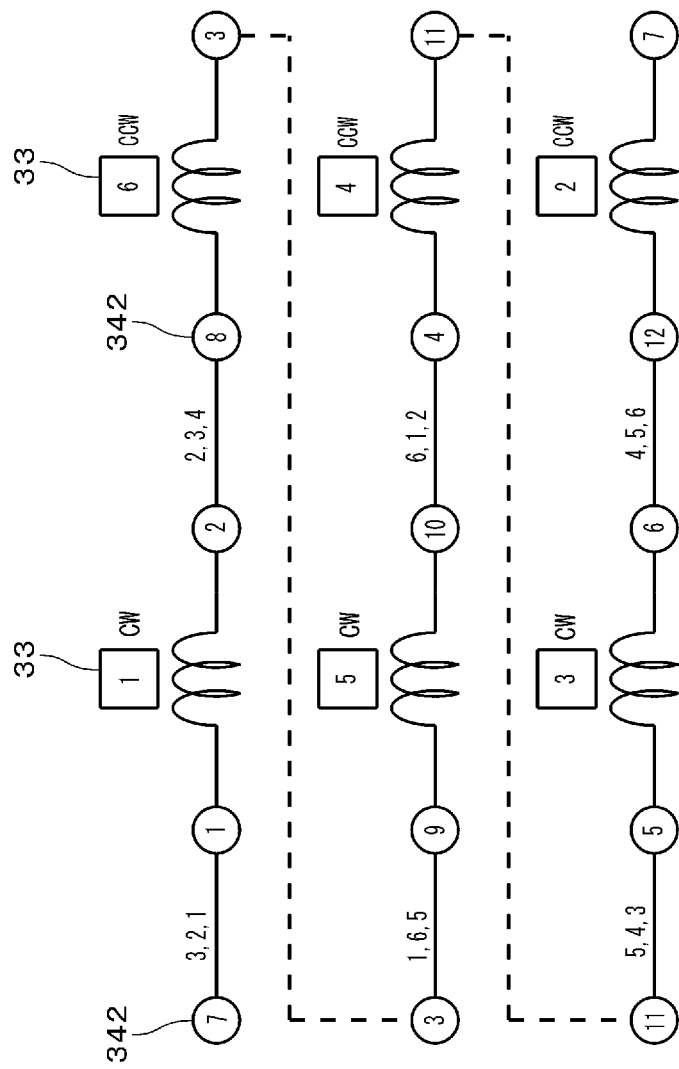
FIG. 8 is a view showing a connection structure between the coils and the segments according to a preferred embodiment of the present invention.
Figure 9:
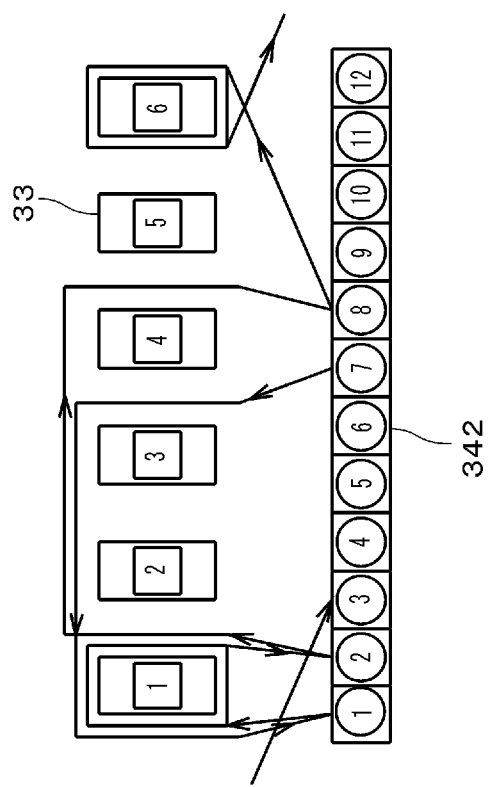
FIG. 9 is a view showing a leading-out of winding according to a preferred embodiment of the present invention.

FIG. 7 is a view showing a simplified positional relationship between the coils 33, the segments 342 and the brush group 23 in the motor preferably equipped with four poles and six slots, and which corresponds to FIG. 3. The number of segments 342 preferably is twelve, for example. The first brush 231 and second brush 232 preferably are disposed at a position deviated from each other at about 90° in the circumferential direction, for example. FIG. 8 is a view showing a winding structure in the motor equipped with four poles and six slots, and the expression thereof is in the same manner as in FIG. 4. FIG. 9 is a view showing a leading-out of winding in the uppermost stage of FIG. 8.

Figure 10:
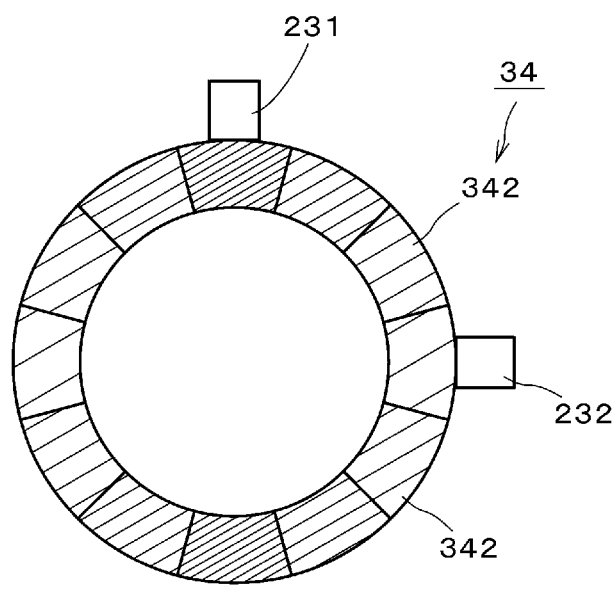
FIG. 10 is a view showing a distribution of potential in a segment group according to a preferred embodiment of the present invention.

FIG. 10 shows a distribution of potentials in the segment group 341. In the segment group 341, the potential is changed between the first potential and the second potential in a cycle of 180°. In the above description, n is 2, and m is 3.

Figure 11:
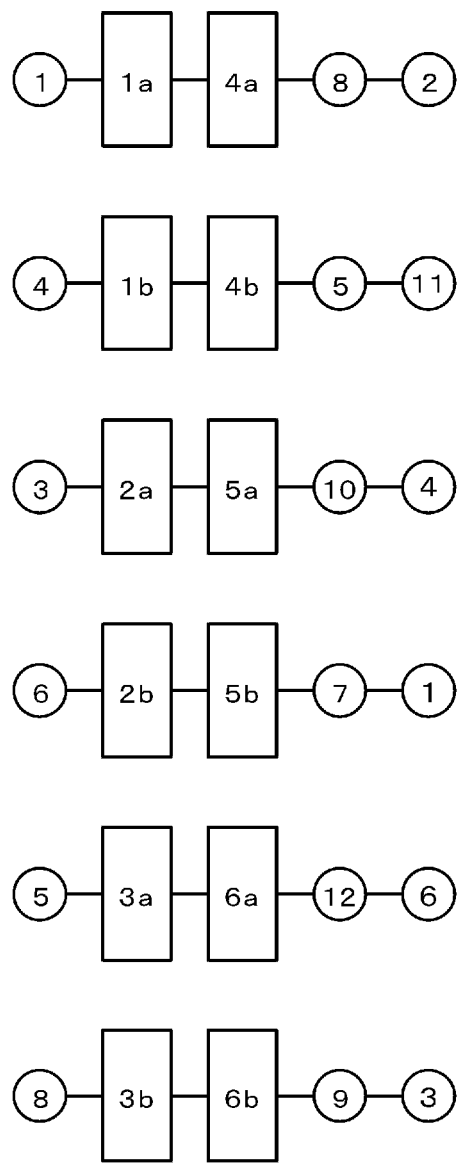
FIG. 11 is a view showing a connection structure between coils and segments in the related art.

FIG. 11 is a view showing a winding structure of the motor equipped with four poles and six slots which is disclosed in JP-A2008-113485. In FIG. 11, the circle indicates a segment, and the rectangle indicates a coil. However, a ½ coil which is defined by winding the conducting wire on a tooth in the clockwise direction and a ½ coil which is defined by winding the conducting wire in the counterclockwise direction are disposed. Therefore, "a" is additionally written to the number of coil wound in the clockwise direction, and "b" is additionally written to the number of coil wound in the counterclockwise direction. In the following description, ½ coil is also referred to as "half coil".

Figure 12:
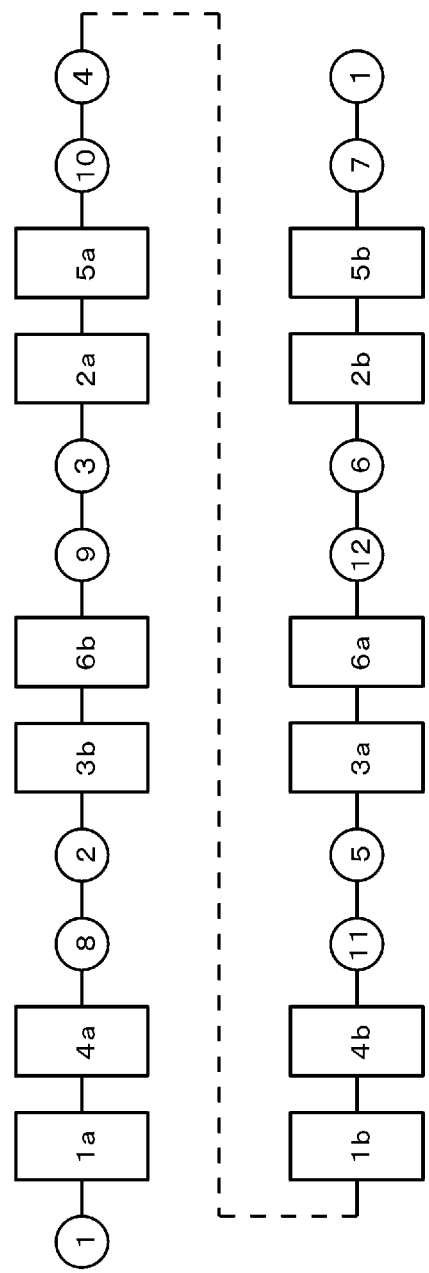
FIG. 12 is a view showing a modified connection structure according to a preferred embodiment of the present invention.
Figure 13:
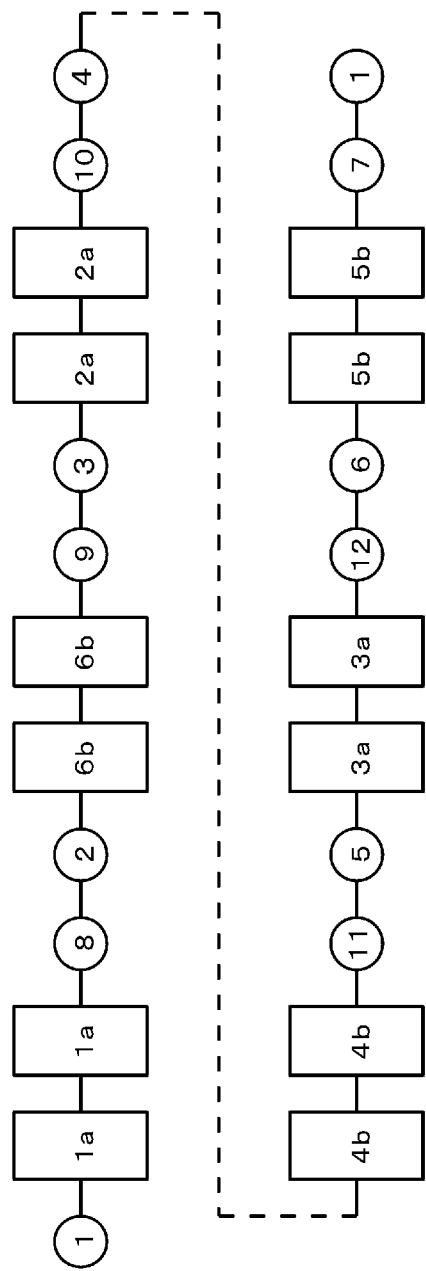
FIG. 13 is a view showing a modified connection structure according to a preferred embodiment of the present invention.

The winding structure shown in FIG. 11 can be combined in a row, as shown in FIG. 12. In this case, a function of the half coil of "4a", the half coil of "1b" or the like is not changed even in the case where the winding direction thereof is changed, and further, a position thereof is moved at 360° in electric angles, as shown in FIG. 13. It is identified by an experimental discovery showing that the torque generated in the half coil of "1a" and the half coil of "4a" is the same in the case where the half coil of "1a" and the half coil of "4a" are disposed at a position deviated from each other at 360° in electric angles. Thus, if the segment 342 being in contact with the first brush 231 is switched from the 1st segment to the 2nd segment, it is used only for switching the excitation in the 1st coil. At the same time, if the segment 342 being in contact with the second brush 232 is switched from the 4th segment to the 5th segment, it is used only for switching the excitation in the 4th coil. As a result, the winding structure shown in FIG. 9 is derived.

Upon comparing this point with the winding structure (hereinafter, referred to as "a first conventional winding structure") disclosed in JP-A2008-113485, switching from the 1st segment to the 2nd segment in the first brush is used for switching the excitation in half of the 1st coil, which is positioned at 0° in electric angle based on the position of the first brush, and half of the 4th coil, which is positioned at 360° in electric angles, in the first conventional winding structure. Also, switching from the 4th segment to the 5th segment in the second brush, which is positioned at 180° in electric angles seen from the first brush, is used to switch the excitation in the other half of the 1st coil, which is positioned at 0° in electric angle, and the other half of the 4th coil, which is positioned at 360° in electric angles.

Furthermore, a function of the first brush is the same even in the case of being positioned at 360° in electric angles, and a function of the second brush is the same even in the case of being positioned at 540° in electric angles. Therefore, if the pair number of magnetic poles is n (n is a natural number equal to or more than 2) and i is at least an integer of 0 or more and (n−1) or less, the position of the first brush can be expressed by electric angles (360×i)°. Also, if j is at least an integer of 0 or more and (n−1) or less, the position of the second brush can be expressed by electric angles (360·j+180)°.

Additionally, in the case where p is an integer of 0 or more and (n−1) or less, the switching of the excitation in the coil positioned at (360×p)° in electric angles is performed by using the switching caused by any first brush and the segment and the switching caused by any second brush and the segment both equally, in the first conventional winding structure. Similarly, in the case where q is an integer of 0 or more and (n−1) or less, the switching of the excitation in the coil positioned at (360×q+180)° in electric angles is also performed by equally using the switching caused by any first brush and the segment and the switching caused by any second brush and the segment.

On the other hand, in the motor 1, it can be expressed that the switching of the excitation in the coil 33 positioned at (360×p) ° in electric angles is performed by only using the switching caused by either one (for example, a first brush 231) of at least a first brush 231 and at least a second brush 232 and the segment 342. Similarly, the switching of the excitation in the coil 33 positioned at (360×q+180)° in electric angles is performed by only using the switching caused by either one (for example, a second brush 232) of at least a first brush 231 and at least a second brush 232 and the segment 342.

When the first conventional winding structure and the winding structure of the motor 1 described above are explained using different expression, with reference to the winding structure (hereinafter, referred to as "a second conventional winding structure") of the general motor in the related art where the number of segments is equal to the number of coils, the description is as follows.

In the second conventional winding structure, the switching of the segment being in contact with the first brush and the switching of the segment being in contact with the second brush occur alternately. The switching of the contacting segment occurs when a center of the coil, namely a center of the tooth, passes through the brush.

In the first conventional winding structure, the number of segments thereof is twice the number of segments in the second conventional winding structure. Thus, the generation of electrical sparking is reduced by applying the method of switching the contacting brush when the brush passes through the center between the coils, namely a center of the slot, to halves of the two coils deviated from each other at (±180)° in electric angles. Therefore, it is necessary to wind a conducting wire on a tooth in both forward and reverse directions, in the first conventional winding structure.

On the other hand, in the winding structure of the motor 1, switching of the contacting brush at the time of passing through the center of the slot is performed only in a coil located at a position deviated at (+180)° or (−180)° in electric angles, namely at a position deviated at (360×q+180)° (q is an integer of 0 or more and (n−1) or less) of electric angles if using more general expression. Therefore it is possible to wind a conducting wire on a tooth only in one direction. As a result, it is possible to reduce sparks and to simplify a winding process by making the number of segments twice the number of coils.

In other words, the winding structure of the motor 1 has a structure where, if p and q are integers of 0 or more and (n−1) or less, half of the coil at (360×p)° in electric angles and half of the coil at (360×q+180)° in electric angles are switched with each other in the first conventional winding structure. Therefore, in the winding structure of the motor 1, the conducting wire is wound around the tooth 321 at (360×p)° in electric angles only in the clockwise direction, and the conducting wire is wound around the tooth 321 at (360×q+180)° in electric angles only in the counterclockwise direction.

Figure 14:
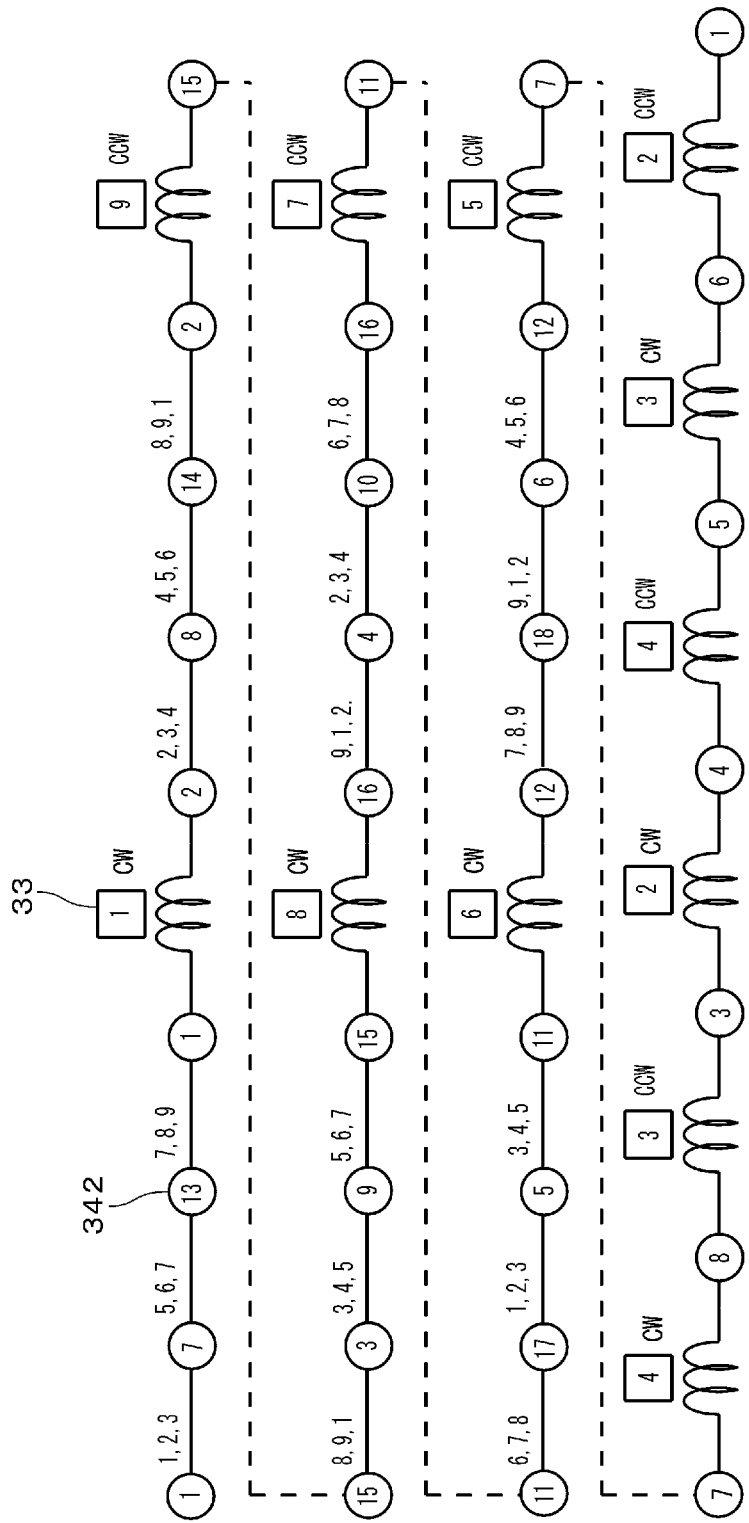
FIG. 14 is a view showing a connection structure between coils and segments according to a preferred embodiment of the present invention.
Figure 15A:
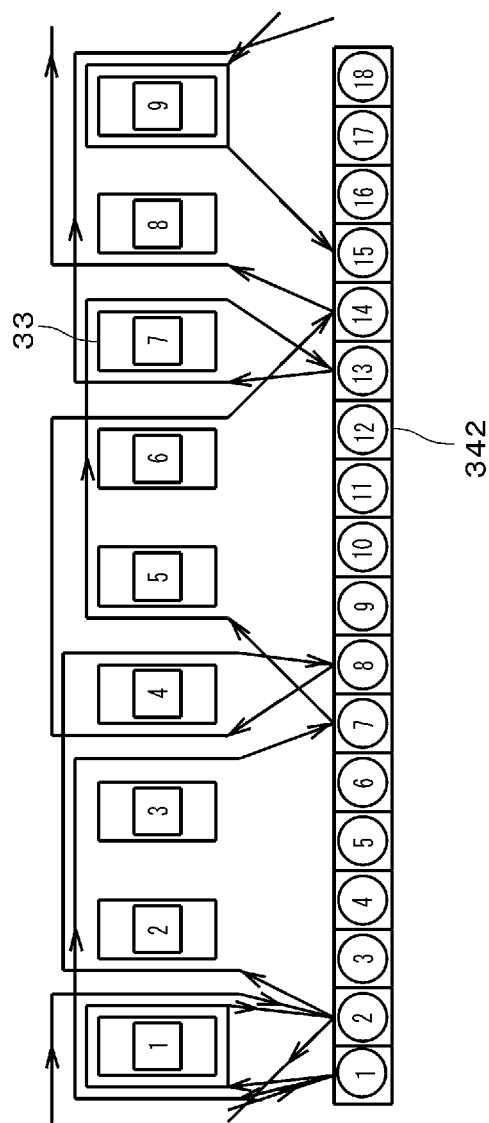
FIG. 15A is a view showing a leading-out of winding according to a preferred embodiment of the present invention.
Figure 15B:
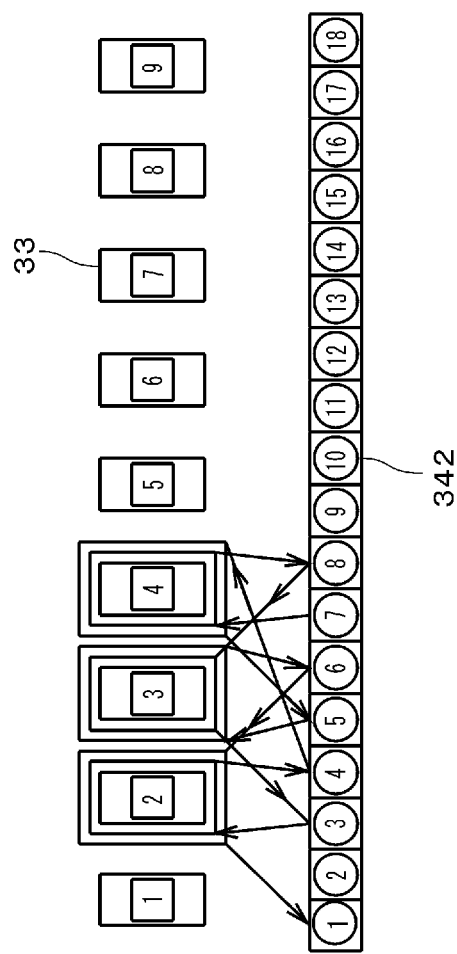
FIG. 15B is a view showing a leading-out of winding according to a preferred embodiment of the present invention.

Next, a non-limiting example of a case where the principle of the winding structure of motor 1 is applied to a motor equipped with six poles and nine slots will be described. FIG. 14 is a view showing a winding structure in the motor preferably equipped with six poles and nine slots, and the expression thereof is in the same manner as in FIG. 8. The number of segments 342 preferably is eighteen, for example. In this case, m is 3, and n is 3 in the description described above. The first brush 231 and the second brush 232 are preferably separated from each other at an odd-number multiple of 60° in the circumferential direction, for example. In the case of the motor equipped with six poles and nine slots, the conducting wire is wound around some teeth 321 in the clockwise and counterclockwise directions as similar to the first conventional winding structure, as shown in FIG. 14. The FIGS. 15A and 15B are views showing leading-outs of windings in a section of the uppermost stage and the lowermost stage of FIG. 14.

Figure 16:
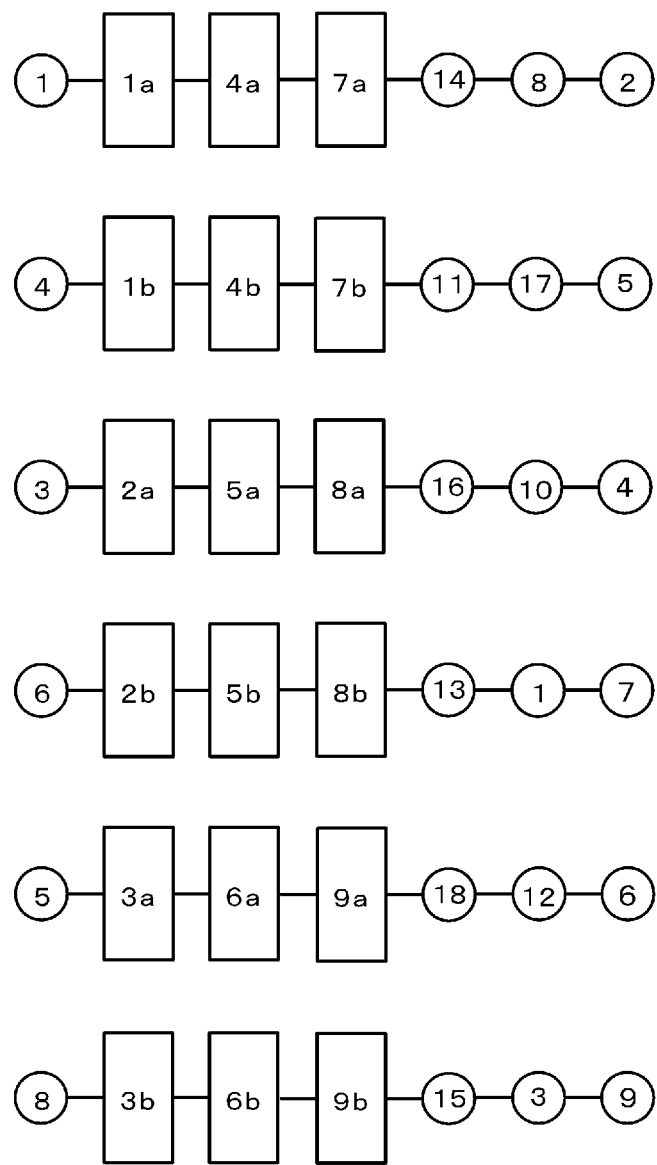
FIG. 16 is a view showing a connection structure between coils and segments in the related art.
Figure 17:
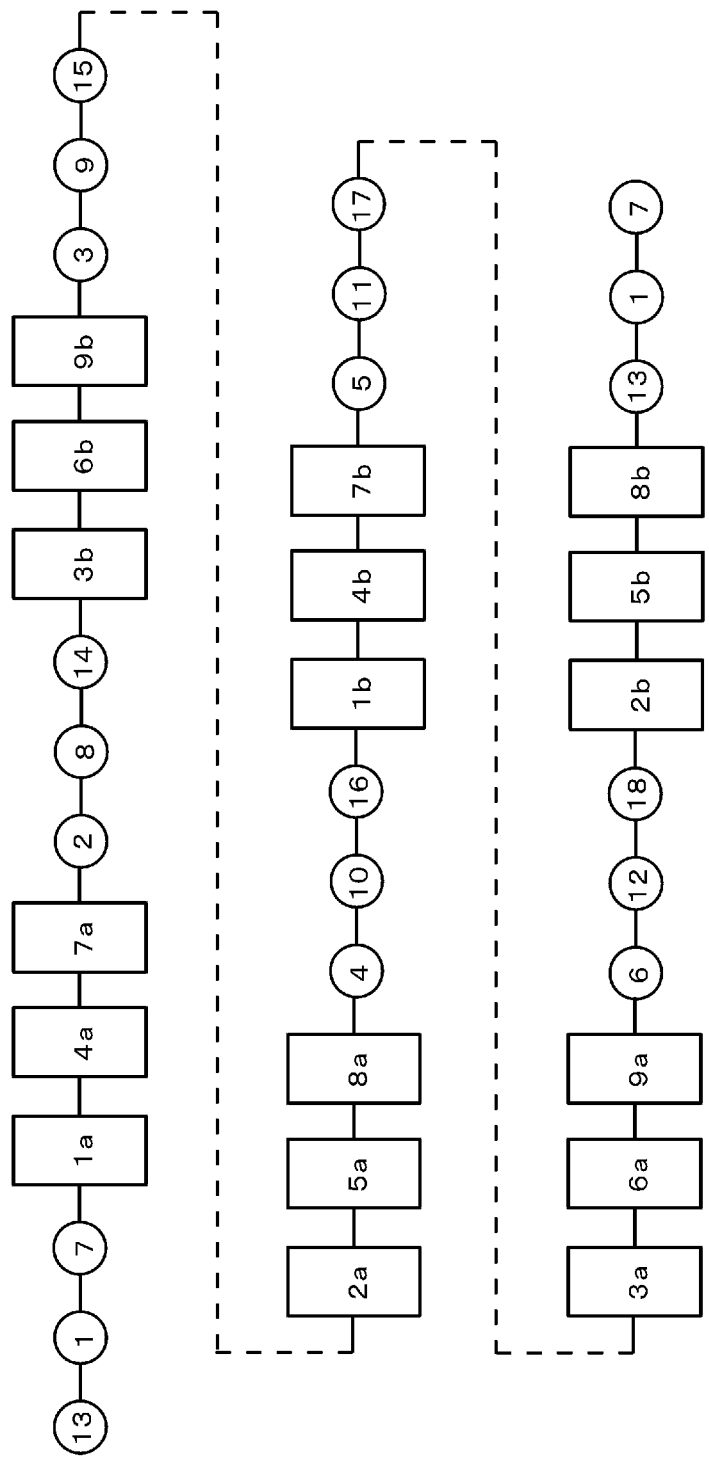
FIG. 17 is a view showing a modified connection structure according to a preferred embodiment of the present invention.
Figure 18:
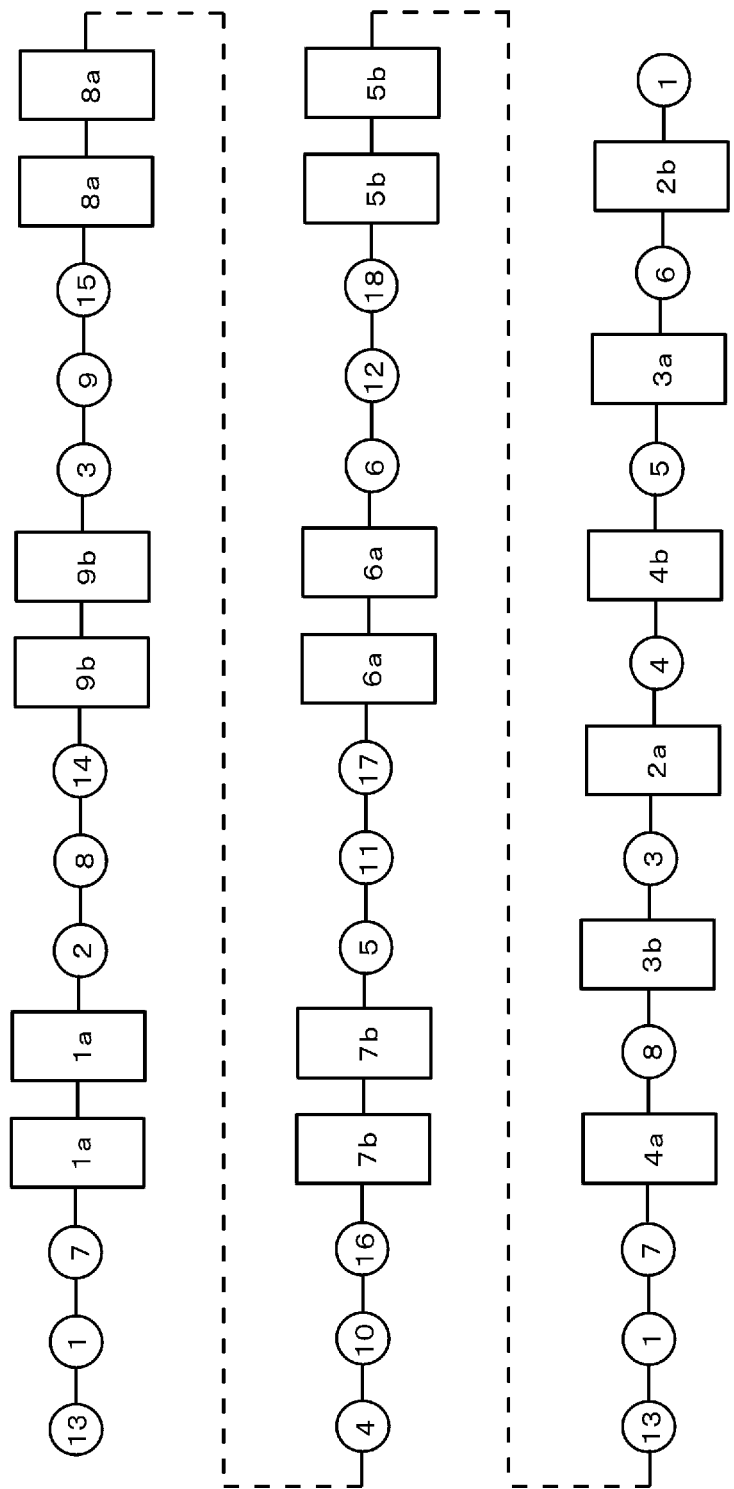
FIG. 18 is a view showing a modified connection structure according to a preferred embodiment of the present invention.

FIG. 16 is a view showing a winding structure of the motor equipped with six poles and nine slots which is disclosed in JP-A2008-113485, and corresponds to FIG. 11. In the case of FIG. 16, the winding wire can be combined in a row as shown in FIG. 17. In this case, three half coils are connected in series. A function of the half coil of "7a", the half coil of "1b" or the like is not changed even in the case where the winding direction thereof is changed, and further, a position thereof is moved at 360° in electric angles. However, a half coil remains among the three half coils. Therefore, by moving the remained half coil so as to be independently interposed between the segments, it is possible to achieve the connection shown in FIG. 18. As a result, it is possible to achieve the winding structure shown in FIG. 14.

In the modified winding structure according to the above method, the half coils remain in the three teeth 321. However, it is possible to perform the rotation of the motor. More generally, if m is 3, and n is an even number, it is possible to provide the coils 33 in which the conducting wire is wound in the clockwise direction or the counterclockwise direction, in each tooth 321. However, if m is 3, and n is an odd number, a pair of half coils 33 in which the conducting wire is wound in the directions opposite to each other are respectively provided in at least three teeth 321. Furthermore, since it is possible to change the connection relationship between the segments 342 and the coils 33 in various ways, it is not necessary to arrange the teeth 321 provided with the half coils continuously in a row.

In the description, m is 3. However, if m is an odd number equal to or more than 3, and n is an even number equal to or more than 2, it is possible to wind the conducting wire on each tooth 321 in one direction. In this case, the coils 33 defined by winding the conducting wire in the clockwise direction and the coils 33 defined by winding the conducting wire in the counterclockwise direction are alternately disposed in the circumferential direction. If n is an odd number equal to or more than 2, a pair of half coils is disposed in the teeth 321 of which the number is odd multiple of m. Also, coils defined by winding the conducting wire in one direction are disposed in the remained teeth 321. Since there are two cases of which one is provided only with coils defined by a conducting wire, and the other one is provided with coils defined by a conducting wire and coils defined by two conducting wires, each end portion of at least a conducting wire which defines each of the coils 33 is connected to any one of segments 342, in the motor.

Stated more generally, only the coils 33 defined by winding a continuous conducting wire in the predetermined winding direction are respectively provided in k teeth 321 among m×n teeth 321, and only the coils 33 defined by winding the continuous conducting wire in the reverse direction are respectively provided in teeth 321 which are respectively disposed at a position separated from the k teeth 321 at 360×i degrees (i is a natural number equal to or lower than (n−1)) of electric angles. In this case, k is a natural number equal to or less than (m×n/2). Furthermore, in the above-description, if the conducting wire is wound around each tooth 321 in the clockwise direction or the counterclockwise direction, 2k is n, namely corresponding to the case in which the number of poles is a multiple of 4. If a pair of half coils is disposed only in m teeth 321, it corresponds to the case where 2k is (n−1). The smaller the number of half coils is, the easier the winding process is.

In this case, it is preferable for the conducting wire of the coil 33 to be connected to the closest segment 342. When the switching of the coil 33 passing through the position of the first brush 231 is carried out by switching the segment 342 in the position of the first brush 231, it is preferable for the coil 33 defined by winding the continuous conducting wire in the clockwise direction or the counterclockwise direction to be connected to two closest segments 342. In this case, the coil 33 defined by winding the continuous conducting wire in the reverse direction is connected to the segment 342 except for the two closest segments 342.

In the preferred embodiment described above, all of the plurality of coils 33 preferably are defined with a conducting wire. In addition, preferably the number of first brushes 231 of first-potential included in the brush group 23 is 1, and the number of second brushes 232 of second-potential is 1, for example. As a result, it is possible to simplify the structure of the motor 1 the most. However, a plurality of conducting wires may be used in the winding structure. In this case, a plurality of first brushes 231 or a plurality of second brushes 232 may be provided while preventing the conducting wire from passing between the segments 342 to some extent. For example, the first brushes 231 may be provided at every 360° in electric angles, and the second brushes 232 may be provided at a position deviated from each first brush 231 at 180° in electric angles, for example.

It is not necessary for the coils wound in the clockwise direction and the coils wound in the counterclockwise direction to be arranged alternately in the circumferential direction. For example, the coils which are located at positions deviated from each other at 360° in electric angles may be appropriately transposed with each other. Further, the coils wound in the clockwise direction may be entirely disposed in a predetermined position in the circumferential direction, and the coils wound in the counterclockwise direction may be entirely disposed in the other position.

It is possible to apply various preferred embodiments of the present invention to various types of motors.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
    a static section;
    a rotation section; and
    a bearing portion which supports the rotation section rotatably around a central axis; wherein
    the rotation section includes:
        a shaft extending along the central axis;
        an armature core including m×n teeth, where m is an odd number equal to or more than 3 and n is a natural number equal to or more than 2, which are attached on the shaft and radially extend in a radial direction;
        a plurality of coils respectively provided on the m×n teeth; and
        a commutator electrically connected to the plurality of coils;
    the static section includes:
        field magnets including 2n magnetic poles facing the m×n teeth in the radial direction; and
        a brush group including at least a first-potential brush and at least a second-potential brush;
    the commutator includes a segment group defined by 2m×n segments which are arranged in a circumferential direction and in contact with the brush group;
    in at least a conducting wire defining each coil, each end portion thereof is connected to any one of the segments;
    in the segment group, a potential is cyclically increased or decreased between a first potential and a second potential in regard to the circumferential direction, due to the contact of the brush group and the commutator;
    m−1 segments are provided between the first-potential segment and the second-potential segment;
    the coils are connected in series between the first-potential segment and the second-potential segment via the segments;
    only the coil defined by winding a continuous conducting wire in a predetermined winding direction is disposed in each of k teeth among the m×n teeth; and
    only the coil defined by winding the continuous conducting wire in a direction reverse to the predetermined winding direction is disposed in each of teeth disposed at a position separated from each of the k teeth at 360×i degrees, where i is a natural number equal to or less than n−1, of electric angles.

2. The motor according to claim 1, wherein k is m*n/2.

3. The motor according to claim 2, wherein
    the coil defined by winding the continuous conducting wire in the predetermined winding direction is connected to two closest segments, and
    the coil defined by winding the continuous conducting wire in the direction reverse to the predetermined winding direction is connected to the segments except the two closest segments.

4. The motor according to claim 3, wherein
    all of the plurality of coils are defined by a conducting wire, and
    the number of first-potential brushes included in the brush group is 1, and the number of second-potential brushes is 1.

5. The motor according to claim 2, wherein
    all of the plurality of coils are defined by a conducting wire, and
    the number of first-potential brushes included in the brush group is 1, and the number of second-potential brushes is 1.

6. The motor according to claim 1, wherein k is m(n−1)/2.

7. The motor according to claim 6, wherein
    the coil defined by winding the continuous conducting wire in the predetermined winding direction is connected to two closest segments, and
    the coil defined by winding the continuous conducting wire in the direction reverse to the predetermined winding direction is connected to the segments except the two closest segments.

8. The motor according to claim 7, wherein
    all of the plurality of coils are defined by a conducting wire, and
    the number of first-potential brushes included in the brush group is 1, and the number of second-potential brushes is 1.

9. The motor according to claim 6, wherein
    all of the plurality of coils are defined by a conducting wire, and
    the number of first-potential brushes included in the brush group is 1, and the number of second-potential brushes is 1.

10. The motor according to claim 1, wherein
    the coil defined by winding the continuous conducting wire in the predetermined winding direction is connected to two closest segments, and
    the coil defined by winding the continuous conducting wire in the direction reverse to the predetermined winding direction is connected to the segments except the two closest segments.

11. The motor according to claim 10, wherein
    all of the plurality of coils are defined by a conducting wire, and
    the number of first-potential brushes included in the brush group is 1, and the number of second-potential brushes is 1.

12. The motor according to claim 1, wherein
    all of the plurality of coils are defined by a conducting wire, and
    the number of first-potential brushes included in the brush group is 1, and the number of second-potential brushes is 1.

* * * * *